United States Patent Office 3,554,611
Patented Jan. 12, 1971

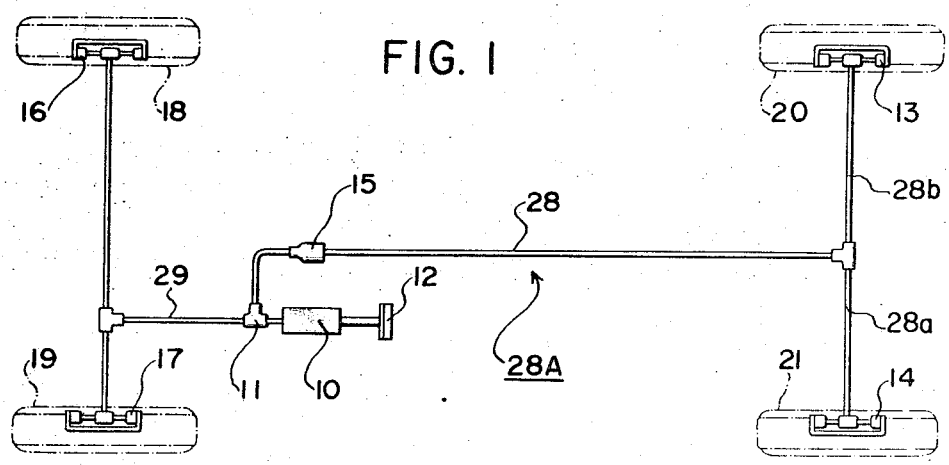
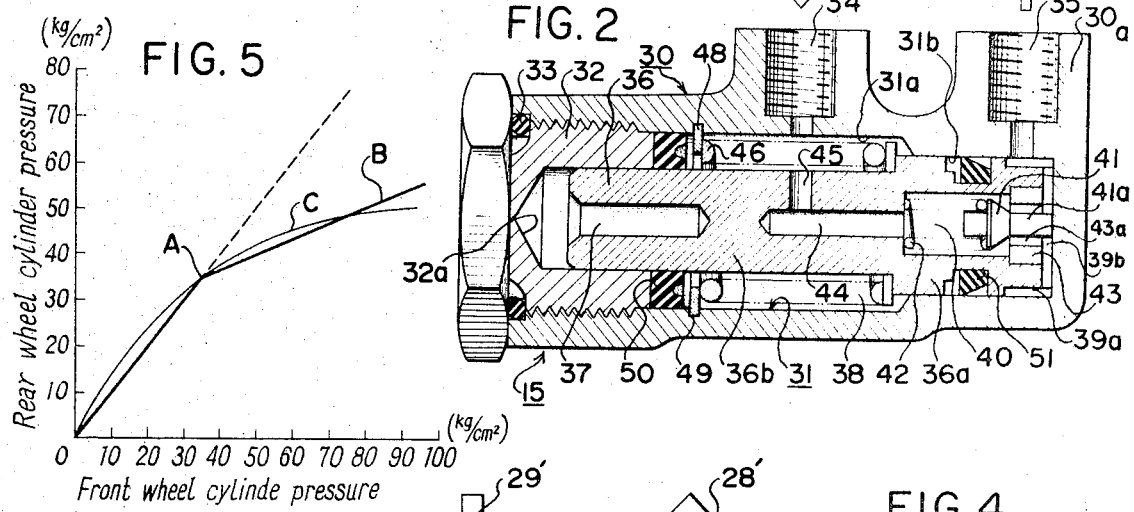
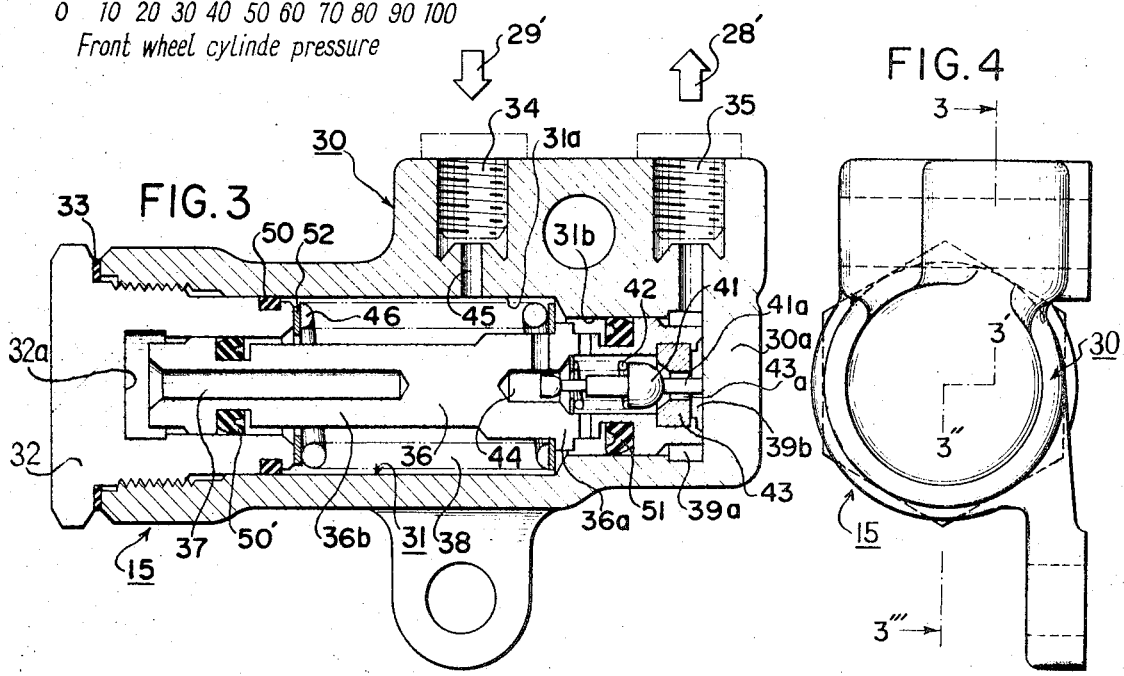

3,554,611
HYDRAULIC BRAKE PRESSURE CONTROL ASSEMBLY
Tsuneo Kawabe, Noriakira Ishigami, and Masashi Ban, Kariya-shi, Japan, assignors to Aisin Seiki Company Limited, Kariya-shi, Aichiken, Japan
Filed Apr. 4, 1969, Ser. No. 813,484
Claims priority, application Japan, Apr. 6, 1968, 43/27,750
Int. Cl. B60t 8/26, 15/00
U.S. Cl. 303—6                               4 Claims

ABSTRACT OF THE DISCLOSURE

This invention concerns with a proportionating hydraulic pressure control valve assembly inserted in a piping provided between a hydraulic master cylinder and rear wheel cylinders on a motor vehicle. The improvements comprise the provision of a pneumatic cushioning chamber defined by the stationary cylinder and the hydraulic piston reciprocatably mounted therein and adapted for assisting the function of an actuating spring provided for said piston, said spring being housed in a first hydraulic chamber formed around said piston and hydraulically connected with the delivery side of said master cylinder. The pressure control valve proper arranged for the on-off control of the hydraulic pressure leading to the rear wheel cylinders through a second hydraulic chamber is mounted within said hydraulic piston, the connecting passage means provided between said both hydraulic chambers and controlled by said control valve proper being provided totally within the body of said hydraulic piston.

---

These arrangements are employed for minimizing possible hydraulic leakage from inside of the valve assembly to outside thereof and providing a compact design thereof without appreciable loss of the required functional performance of the control valve assembly.

This invention relates to a device for use in connection with hydraulic braking mechanisms on motor vehicles, which is adapted for reducing that acting on rear wheels with respect to the braking power on fore wheels beyond a certain braking pressure, when hydraulic wheel brake cylinders are under working conditions.

In conventional vehicle hydraulic brake systems, equal hydraulic pressures are generally delivered to the front and rear wheel cylinders upon operation of the pressure generating means such as a foot pedal-operated hydraulic master cylinder, a brake booster assembly or power operated mechanism.

It is well known that in a substantial brake application, a heavier braking of the rear wheels may frequently occur, leading under most occasions to the disadvantageous locking and sliding of the rear wheels. This defective braking is largely enhanced by the fact that there is substantial weight shift during the brake application, thus causing the weight supported by the rear wheels being correspondingly reduced.

In order to avoid occurrence of these drawbacks, various means have been proposed and are now in broad use, which are capable of limiting the supply of hydraulic pressure to the rear wheel cylinders relative to that in the front wheel cylinders and beyond a certain point, so as to provide a correction of the rear wheel cylinder pressure for reducing the possibility of rear wheel skid.

The said hydraulic pressure limiting means are shaped generally into a proportionator in the form of a hydraulic pressure control valve assembly inserted in piping means for reducing the hydraulic braking pressure delivered from the master cylinder to the rear wheel cylinders upon intentional increase of the master cylinder pressure beyond a predetermined value, said assembly comprising a stationary cylinder opened at its one end only; a plug closing said open cylinder end; a stepped piston slidably mounted in said cylinder; actuating spring urging said piston towards to its rest position, a first hydraulic chamber fluidically connected to said master cylinder; a second hydraulic chamber fluidically connected to said rear wheel cylinders and a valve provided in communication passage between said both hydraulic chambers and controlled to open and close by the reciprocating movement of said piston.

It is a predominant requirement for the above kind braking system comprising said kind of hydraulic pressure control valve assembly to minimize the member of sealing means for avoiding otherwise possible failure of the hydraulic master and/or wheel cylinder pressures prevailing in the whole braking system especially within said control valve assembly.

It is therefore the main object of the invention to provide a hydraulic pressure control valve assembly of the above kind, which is highly efficient for attaining assured sealing conditions thereof, yet without any appreciable loss of the required compactness in the design of said assembly as well as of the efficient pressure control performance of said valve.

For this purpose, the pressure control valve assembly according to this invention, starting from the aforementioned conventional design and functional features, is characterized by a minimum number of sealing means such as one, or at the largest number of two, for effectively minimizing otherwise possible leakage of the hydraulic liquid from said hydraulic chambers to outside thereof, and by an air cushioning chamber provided within the piston-receiving bore and at one end thereof in proximity to said open cylinder end, for reducing otherwise possible larger dimensions of said actuating spring, the latter being specifically housed within the first hydraulic chamber.

These and further objects, features and advantages of the invention will appear more fully as the description proceeds by reference to the accompanying drawings which constitute part of the present specification.

In the drawings:
FIG. 1 is a schematic view showing a hydraulic brake system embodying as a part thereof the hydraulic pressure control valve assembly.

FIG. 2 is substantially an enlarged longitudinal sectional view of a first embodiment of the hydraulic pressure control valve assembly shown in FIG. 1.

FIG. 3 is a similar view to FIG. 2, showing a second embodiment of the pressure control vavle assembly, the section being taken along a section line 3–3'–3''–3''' shown in FIG. 4.

FIG. 4 is an end view of the pressure control valve assembly shown in FIG. 3.

FIG. 5 is a graph showing a standard performance curve of the pressure control valve assembly according to this invention, said curve being plotted in comparison with an ideal or theoretical distribution curve.

In the following, several preferred embodiments of the invention will now be described with reference to the drawings.

In the hydraulic brake system shown in FIG. 1, a master cylinder 10 is arranged to generate hydraulic pressure at its outlet pipe fitting 11, which is formed into a T, when a conventional foot-operated brake pedal 12 is depressed.

Hydraulic fluid pressure is conducted to the wheel cylinders of the drum-type brakes 13 and 14 at the rear wheels 20 and 21, being shown only schematically by chain lines, of the vehicle through the improved hydraulic pressure control valve assembly 15 shown in a highly simplified manner and to be described in detail hereinafter.

At the same time, hydraulic fluid pressure is directly conducted to the wheel cylinders again of the drum-type brakes 16 and 17 at the front wheels 18 and 19 shown by chain lines. The control valve assembly 15 does not alter the pressure of the hydraulic fluid from the master cylinder 10 until a pressure of approximately 35 kgs. per square centimeters, as an example, is reached, thereafter operating as a kind of proportionating valve means adapted for reducing the additional increase of pressure.

In FIG. 2, the valve assembly 15 comprises a hydraulic cylinder body 30 which is formed with a stepped cylinder space generally shown at 31, having larger bore part 31a and a smaller bore part 31b, thus said body 30 being opened at its one end or more specifically at its left-hand end only. This opened cylinder end is closed by a screw plug 32, preferably through the intermediary of a sealing ring 33. This sealing means 33 may be omitted if desired.

The cylinder body 30 is formed with a first bore 34, leading through a piping 29 which is shown in FIG. 1 in a specific way, yet in a highly simplified manner by an arrow 29' in FIG. 2, to the master cylinder 10 (FIG. 1). The body is further formed with a second bore 35 which leads, through a main piping 28 and branch pipings 28a and 28b, to rear wheel cylinders 13 and 14 as was briefly described hereinbefore with reference to FIG. 1. In FIG. 2, this piping system is hinted by an arrow 28'.

Within the bore 31, there is provided slidably a stepped piston generally shown at 36, having a larger piston element 36a and a smaller piston element 36b made integral therewith. The former element 36a cooperates slidably with the inside wall surface of the smaller cylinder space 31b.

The smaller piston element 36b extends substantially through the larger cylinder space 31a and thence into the blind bore at 32a of the closure plug 32. At the free or left-hand end of the smaller piston element 36b, there is formed a blind bore 37 the purpose of which will be described in detail hereinafter. A circular hydraulic fluid chamber 38 is formed between the inside wall surface of the larger cylinder space and the peripheral surface of the smaller piston element, said chamber 38 being kept in permanent fluid communication with the first bore 34 and called "first hydraulic chamber" throughout this specification.

A further hydraulic chamber is formed at the outer end of the smaller cylinder chamber, said hydraulic chamber being constituted, under normal off-service conditions of the control valve assembly, by a peripheral ring space 39a formed around the reduced end of the larger piston element, and a straight lined recess 39b cut vertically on the related piston head. Therefore, it will be easily understood that the right-hand piston head is normally kept in physical contact with the end wall surface of the cylinder body which defines the right-hand extremity of the bore 31. The number of the recess 39a may be increased to two to four if necessary. Or alternatively, the recess may be in the form of a cross. As will be described hereinafter, the propotionating operation of the pressure control valve assembly is brought about with the hydraulic piston 36 moved leftwards from the position shown. In this case, the volume of second hydraulic chamber increased by the additional one which is newly formed between the piston head and the cylinder end wall.

A longitudinal valve chamber 40 is formed within the larger piston element and houses substantial part of valve member 41 which is formed with a stem 41a made integral therewith, said stem abutting normally against the cylinder end wall 30a under the influence of a back-up spring 42 which is housed in the valve chamber 40 and acts upon the valve member to urge it for moving in the valve-closing direction. At the outer end of the valve chamber 40, there is a valve seat member 43 shaped into a sleeve fixedly attached by press-fitting, for instance, to the piston, said stem extending with ample plays through the axial bore of said sleeve as shown, for defining a hydraulic passage around said stem so as to thereby establish fluid communication between the second hydraulic chamber 39 and the vavle chamber 40, so far as the valve is kept in its open position as shown. As seen, the valve chamber and the first hydraulic chamber are kept in permanent hydraulic communication with each other via longitudinal and transverse passages 44 and 45 formed in the body of piston 36.

Actuating spring 46 is housed in the first hydraulic chamber 38, one end of the spring abutting against a retainer ring 47 which abuts in turn against the stepped or larger piston working surface, while the opposite end of the spring abuts against a stop ring 48 shaped into a snap spring ring which is positioned in engagement with a circular recess 49 formed in the hydraulic cylinder wall surface in the field of the larger cylinder bore.

Cup-shaped sealing member 50 is provided at the left-hand end of the first hydraulic chamber for effectively sealing off thereat any possible hydraulic leakage. A sealing ring 51 is provided on the peripheral surface of the larger piston element, so as to effectively interrupt any hydraulic bypass communication directly between the first and second hydraulic chambers with each other. The actuating spring 46 urges, in combination with the hydraulic master cylinder pressure prevailing in the first hydraulic chamber, the hydraulic piston to move in the right-hand direction for keeping normally it at the off-service position shown.

The operation of the hydraulic pressure control valve assembly so far shown and described is as follows:

Upon depressing the foot-operated pedal 12, as was referred to, for actuating the brake system in FIG. 1, the braking hydraulic pressure will be conveyed from the master cylinder 10 through 11 and 29, to the inlet port 34 of the control valve assembly 15; thence further through first hydraulic chamber 38; communication passages 45, 44; valve chamber 40; valve bore 43a; second hydraulic chamber 39b, 39a; outlet bore 35; piping system 28, 28a and 28b to rear wheel cylinders 13 and 14. At the same time, front wheel cylinders 16 and 17 are fed with the hydraulic fluid pressure directly from the master cylinder 10, as was referred to. Thus, the braking action is initiated. In the course of the braking operation, so far as it is brought about to the normal degree with smaller master cylinder pressure than a certain predetermined value such as that at A in FIG. 5, which valve may be about 35 kgs. per square centimeters, the braking progress being along the line 0–A shown therein, the hydraulic piston 36 is kept positioned in that shown in FIG. 2. The design and arrangement of main working parts of the control valve assembly are so selected that under this braking condition the hydraulic force acting on the larger piston element in the second hydraulic chamber is larger than that acting on the differential piston area between larger and smaller piston elements. Therefore, this differential hydraulic force will tend to move the piston assembly towards left in FIG. 1. When this force which increases with the foot-operated braking effort attains the predetermined value corresponding to the critical point A, the piston assembly will be moved in the above sense against the action of main spring 46, plus the gradually increasing reaction of the pneumatic compression force accumulated in the confined air within the cushioning chamber 32a, 37. In this way, the valve member 41 is brought into its closed position, for interrupting hitherto established hydraulic communication between both hydraulic chambers 38 and 39a–b by closing the fluid passage 43a. Thus, in effect, the hydraulic communication between both first and second parts 34 and 35 is naturally interrupted.

With increased foot-operated braking effort and thus with increased hydraulic pressure from master cylinder 10, the hydraulic force acting upon said differential piston area will naturally increase, while the hydraulic pressure acting on the larger piston area is kept unchanged. Thus, the piston assembly will initiate its return movement towards its regular or off-service position shown. Thanks to the increased compression energy accumulated in main spring 46 and in the confined air mass in the cushioning chamber in the course of the working stroke of the piston, the stroke of the piston assembly is of a short distance. Said cushioning chamber provides thus a kind of pneumatic spring which assists the operation of main spring 46 and contributes substantially to reduce the overall dimensions of the control valve assembly. By the provision of the main spring 46 within the first hydraulic chamber, this advantage is further accentuated. The provision of the pneumatic cushioning chamber provides such a further advantage that occassionally leaked oil at sealing means 50 from the first hydraulic chamber longitudinally towards outside will be accumulated in the cushioning chamber and thus any substantial leakage of the braking liquid from the first hydraulic chamber is positively prevented and possible unintentional and substantial drop in the master cylinder pressure leading to failure of effective wheel braking may effectively be avoided.

In this way, the piston assembly will so to speak vibrate at a relatively high frequency and reduce the delivery pressure from port 35 to the rear wheel cylinders relative to the front wheel cylinder pressure and in the ratio of the differential piston area to the larger piston area, so far as the foot-operated braking effort and thus the hydraulic master pressure are further increased, the latter being naturally higher than that measured at A in FIG. 5. The hydraulic pressure reduction downstream of the control valve assembly towards the rear wheel cylinder is found to take place relative to the front wheel cylinder pressure which is practically equal to the occasional master cylinder pressure. Therefore, the rear wheel cylinder pressure plotted against the front wheel cylinder pressure under these pressure-controlled braking conditions will progress a certain obtuse performance curve as at A–B shown in FIG. 5 which is highly close to the ideal proportion curve shown at C therein.

With the foot pressure released from the foot pedal, the brake-releasing process will take place substantially along the line B–A–0. All the constituents of the control valve assembly will return to their starting position.

It may be easily understood that even if there should be a considerable liquid leakage into the cushioning chamber so that an oil lock of the hydraulic piston could be invited, the hydraulic braking action will not be interrupted, since in this case the valve member is kept in its open position and the hydraulic braking action will be carried out, yet without the aforementioned pressure control mode. Therefore, otherwise possible dangerous condition of lack of the brake actuation which may be encountered in conventional comparative brake arrangements if it is intended to minimize the number of sealing means for the purpose of minimizing the possible leakage of the hydraulic liquid from the interior spaces of the pressure control means of the similar kind, towards outside thereof, for keeping always the effective braking function of the hydraulic braking system assured.

The provision of the control valve member 41 within the interior of the working piston and the provision of the communication passage between the first and the second hydraulic chamber totally within the inside of the working or control piston, the overall assembly is made further in a highly compact mode which feature is also much advantageous for use in automotive vehicles and without any appreciable loss of the working performance of the hydraulic braking system comprising the above kind of hydraulic pressure control valve assembly.

The second embodiment of the invention shown in FIGS. 3–4 is substantially similar to that shown and described in FIG. 1, except that the inner end of the closure plug 32 receives one end of the main spring 46 through the intermediary of a movable retaining ring 52. Thanks to this modified construction, the tension of said main spring can be easily adjusted from outside of the control valve assembly, and for meeting occasional demands, by screwing to and fro the closure plug.

Other design and functional features are substantially same as before. Therefore, same reference symbols as before are used also in this second embodiment for easy comparison and more easy understanding of the invention without further detailed analysis of its design and function.

The embodiments of the invention in which an exclusive property or priviledge is claimed are defined as follows:

1. In a proportionating hydraulic pressure control valve assembly inserted in a piping extending from a hydraulic master cylinder to rear wheel cylinders on a motor vehicle, the improvement comprises a bored cylinder body opened and female threaded at one end thereof; two ports provided through the bore wall of said cylinder, one port being hydraulically connected to the outlet of said master cylinder and other port being hydraulically connected to the rear wheel cylinder; a stepped hydraulic piston slidably mounted in the bore of said cylinder body, said piston having a large piston element and a small piston element; a valve means provided in said hydraulic piston and comprising a head and a stem made integral therewith; a spring provided in said hydraulic piston for urging said valve means toward its closed position; an actuating spring for urging said piston in the closing direction of said valve means; a closure plug comprising a head element exposed externally and a stem element, the latter being male threaded for sealingly engaging the female threads in the open end of said cylinder body, said piston being sealingly slidable with its one end relative to said plug; a first hydraulic chamber formed around said small piston element and kept in permanent fluid communication with said first port; a second hydraulic chamber formed at one end of said cylinder for cooperation with the head of said large piston element; a communication passage formed in the body of said piston for establishing a communication between said first and second hydraulic chamber; said valve means being provided in said communication passage; said actuating spring being housed in said first hydraulic chamber.

2. The hydraulic pressure control valve assembly as set forth in claim 1, wherein said actuating spring is tensioned between said plug and said stepped piston.

3. The hydraulic pressure control valve assembly as set forth in claim 1, wherein a pneumatically cushioning chamber is provided which is defined between said plug and said small piston element for assisting the action of said actuating spring.

4. The hydraulic pressure control valve assembly as set forth in claim 1, wherein a sealing means is provided at one end of said first hydraulic chamber which is near to said open end of said cylinder body, and between the latter and said piston.

References Cited
UNITED STATES PATENTS

| 704,557 | 7/1902 | Michener | 137—514.5 |
| 1,073,719 | 9/1913 | Timmer | 137—514.5 |
| 3,462,200 | 8/1969 | Lewis et al. | 303—6(C) |

MILTON BUCHLER, Primary Examiner

J. J. McLAUGHLIN, Jr., Assistant Examiner

U.C. Cl. X.R.

60—54.5; 137—514.3, 514.5; 188—152; 303—22

UNITED STATES PATENT OFFICE
CERTIFICATE OF CORRECTION

Patent No. 3,554,611          Dated January 12, 1971

Inventor(s) Tsuneo Kawabe et al

It is certified that error appears in the above-identified patent and that said Letters Patent are hereby corrected as shown below:

In column 6 of the patent, line 33 change "closing" to --opening--.

Signed and sealed this 13th day of July 1971.

(SEAL)
Attest:

EDWARD M. FLETCHER, JR.          WILLIAM E. SCHUYLER, JR.
Attesting Officer                Commissioner of Patents